(12) United States Patent
Bassalay et al.

(10) Patent No.: US 11,798,048 B2
(45) Date of Patent: Oct. 24, 2023

(54) SERVICE PARTNER SELECTION USING A CONFERENCE SYSTEM

(71) Applicant: Avaya Management L.P., Santa Clara, CA (US)

(72) Inventors: Stefan Bassalay, Ennepetal (DE); Uwe Ehlert, Brighton, CO (US)

(73) Assignee: Avaya Management L.P., Morristown, NJ (US)

( * ) Notice: Subject to any disclaimer, the term of this patent is extended or adjusted under 35 U.S.C. 154(b) by 480 days.

(21) Appl. No.: 16/916,521

(22) Filed: Jun. 30, 2020

(65) Prior Publication Data

US 2021/0406972 A1 Dec. 30, 2021

(51) Int. Cl.
*G06Q 30/00* (2023.01)
*G06Q 30/0601* (2023.01)
*G06Q 30/016* (2023.01)
*G06Q 30/0283* (2023.01)
*G06Q 30/0282* (2023.01)
*G06Q 30/018* (2023.01)

(52) U.S. Cl.
CPC ....... *G06Q 30/0611* (2013.01); *G06Q 30/016* (2013.01); *G06Q 30/018* (2013.01); *G06Q 30/0282* (2013.01); *G06Q 30/0283* (2013.01)

(58) Field of Classification Search
CPC ............. G06Q 30/0611; G06Q 30/016; G06Q 30/018; G06Q 30/0282; G06Q 30/0283
USPC ...................................................... 705/26, 27
See application file for complete search history.

(56) References Cited

U.S. PATENT DOCUMENTS

| | | | |
|---|---|---|---|
| 2005/0108328 A1* | 5/2005 | Berkeland | H04L 12/1822 709/204 |
| 2007/0073610 A1* | 3/2007 | Marugabandhu | G06Q 40/04 705/37 |
| 2008/0172381 A1* | 7/2008 | Suh | G06Q 10/06 707/999.005 |
| 2009/0125432 A1 | 5/2009 | Deshpande et al. | |
| 2014/0032683 A1* | 1/2014 | Maheshwari | H04L 51/214 709/206 |

(Continued)

OTHER PUBLICATIONS

Deshpande, Prasad M. et al, "Auction Based Models for Ticket Allocation Problem in IT Service Delivery Industry", IEEE International Conference on Services Computing, 2008, 8pgs; Google (Year: 2008).*

*Primary Examiner* — Robert M Pond (57) ABSTRACT

The technology disclosed herein enables automatic selection of a service partner to handle a service ticket over a conference session facilitated by a conference system. In an embodiment, a method provides, in a partner selection system, selecting service partners from a plurality of potential service partners based on a first service ticket and partner information about the service partners. The method further provides transferring an invite to the service partners to join a conference session with the partner selection system, wherein the invite describes the first service ticket and, after establishing the conference session with a first endpoint of a first service partner of the service partners, receiving first bid information in real-time over the conference session from the first endpoint. Also, the method provides selecting the first service partner based on the first bid information and transferring a selection notification to the first service partner over the conference session.

20 Claims, 8 Drawing Sheets

(56) References Cited

U.S. PATENT DOCUMENTS

| | | | |
|---|---|---|---|
| 2014/0278600 A1* | 9/2014 | Puthiyottil | G06Q 10/063114 |
| | | | 705/5 |
| 2014/0279149 A1* | 9/2014 | Barlow | G06Q 30/08 |
| | | | 705/26.3 |
| 2017/0006161 A9 | 1/2017 | Riahi et al. | |
| 2017/0052820 A1* | 2/2017 | Hayden | G06F 16/24 |

* cited by examiner

SERVICE PARTNER SELECTION USING A CONFERENCE SYSTEM

TECHNICAL BACKGROUND

When an entity, such as a business enterprise, needs to service products supplied by the entity, the entity may contract with third-party service partners to handle the servicing of the products. Using service partners allows the entity more flexibility than having to staff its own employees to handle service requests in various locations. In many cases, multiple service partners may exist that could potentially handle a particular service request. Selecting one of the service partners to handle the request can be a tedious process, especially when the entity would like to ensure an optimal balance between cost to the entity and performance of the selected service partner when handling the request.

SUMMARY

The technology disclosed herein enables automatic selection of a service partner to handle a service ticket over a conference session facilitated by a conference system. In a particular embodiment, a method provides, in a partner selection system, selecting service partners from a plurality of potential service partners based on a first service ticket and partner information about the service partners. The method further provides transferring an invite to the service partners to join a conference session with the partner selection system, wherein the invite describes the first service ticket and, after establishing the conference session with a first endpoint of a first service partner of the service partners, receiving first bid information in real-time over the conference session from the first endpoint. Also, the method provides selecting the first service partner based on the first bid information and transferring a selection notification to the first service partner over the conference session.

In some embodiments, the method includes receiving the service ticket from a service ticketing system.

In some embodiments, the method includes determining a payment value of the first service ticket, wherein the invite includes the payment value. In those embodiments, determining the payment value may be based on one or more of a group comprising a first requestor associated with the first service ticket, an impact of the first service ticket, and a location of the first service ticket. Also, in those embodiments, the method may include reducing the payment value as time passes until the first service ticket is completed and/or reducing the payment value in response to feedback from a first requestor associated with the first service ticket.

In some embodiments, the method includes receiving second bid information from a second service partner of the service partners. In those embodiments, selecting the first service partner includes determining that a combination of the first bid information and a first rating for the first service partner, which may be included in the partner information, is better than a combination of the second bid information and a second rating for the second service partner. In those embodiments, the method may include determining the first rating based on feedback regarding previous service tickets that the first service partner has handled. Also, in those embodiments, the method may include receiving at least a portion of the feedback from requestors associated with the previous service tickets.

In another embodiment, an apparatus is provided having one or more computer readable storage media and a processing system operatively coupled with the one or more computer readable storage media. Program instructions stored on the one or more computer readable storage media, when read and executed by the processing system, direct the processing system to select service partners from a plurality of potential service partners based on a first service ticket and information about the service partners. The program instructions further direct the processing system to transfer an invite to the service partners to join a conference session with the partner selection system, wherein the invite describes the first service ticket and, after the conference session is established with a first endpoint of a first service partner of the service partners, receive first bid information in real-time over the conference session from the first endpoint. Also, the program instructions direct the processing system to select the first service partner based on the first bid information and a first rating for the first service partner and inform the first service partner over the conference session.

DETAILED DESCRIPTION

Service partners of an entity are third party entities that are contracted to handle service issues on behalf of the entity. Not all service partners have the same characteristics. The monetary costs may vary between service partners, certain service partners may be better at handling certain types of service requests, certain service partners may handle service requests more quickly, or service partners may have some other differentiating characteristic. The entity will, therefore, want to select a service partner with characteristics that are best suited to handle a particular service request. A service partner may be best suited to handle a particular request even if the service partner is not the cheapest service partner with respect to cost for handling a service request. Rather, the service partner may have characteristics that provide value that goes beyond the mere cost. For instance, the selected service partner may be able to handle the service request faster than other service partners and/or may have a higher customer satisfaction rating that other service partners. The partner selection systems described below use conference systems to gather bid information from service partners. The bid information, in addition to other information accessible to the partner selection systems (e.g., historical performance information), enables the partner selection systems to better choose a service partner that is likely to be the optimal service partner for handling a particular service request.

Figure 1:
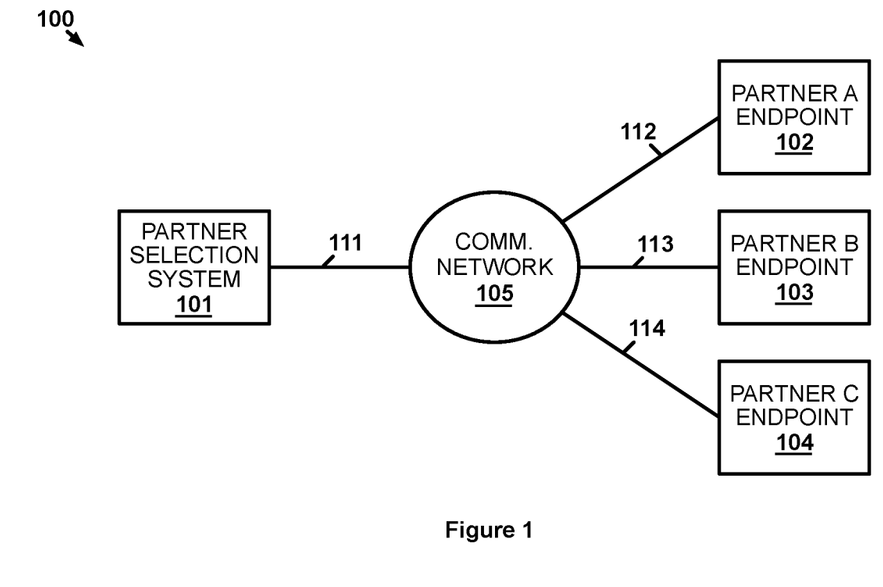
FIG. 1 illustrates an implementation for selecting a service partner using a conference system.

FIG. 1 illustrates implementation 100 for selecting a service partner using a conference system. Implementation 100 includes partner selection system, partner A endpoint 102, partner B endpoint 103, partner C endpoint 104, and communication network 105. Partner selection system 101 and communication network 105 communicate over communication link 111. Endpoints 102-104 and communication network 105 communicate over communication links 112-114, respectively. Communication links 112-114 may comprise wireless and/or wired communication links and may include intervening communication networks, systems, and devices. Communication network 105 may include one or more local area networks and/or wide area networks, such as the Internet. Communication network 105 may include one or more packet based networks and/or circuit switched networks.

Endpoints 102-104 are computing systems operated by respective partners A-C that include processing circuitry, communication circuitry, and a user interface that enable endpoints 102-104 to perform as described below. An endpoint of endpoints 102-104 may be a telephone, laptop, personal computer, tablet computer, or some other type of user operable computing device. Partner selection system 101 also includes processing circuitry, communication circuitry, and, optionally, a user interface that enables partner selection system 101 to perform as described below. Partner selection system 101 may be a computing system similar to endpoints 102-104 that is operated by a user or may be a different type of computing system, such as a server system.

In operation, partner selection system 101 selects one of service partners A-C to handle a service ticket on behalf of an entity, such as a business enterprise. A service ticket is a commonly used term for an internal service request. Although, it should be understood that the term service ticket herein is meant to cover any type of service request that would warrant partner selection system 101 selecting a service partner. Partner selection system 101 balances characteristics of each of service partners A-C to automatically determine which of service partners A-C is likely to be the optimal service partner to handle the service ticket. For instance, an optimal service partner is a service partner that partner selection system 101 determines will handle the service ticket in at least an acceptable manner to a customer, or other type of requestor, associated with the service ticket while also not charging the entity of partner selection system 101 more than a reasonable amount of monetary compensation.

Figure 2:
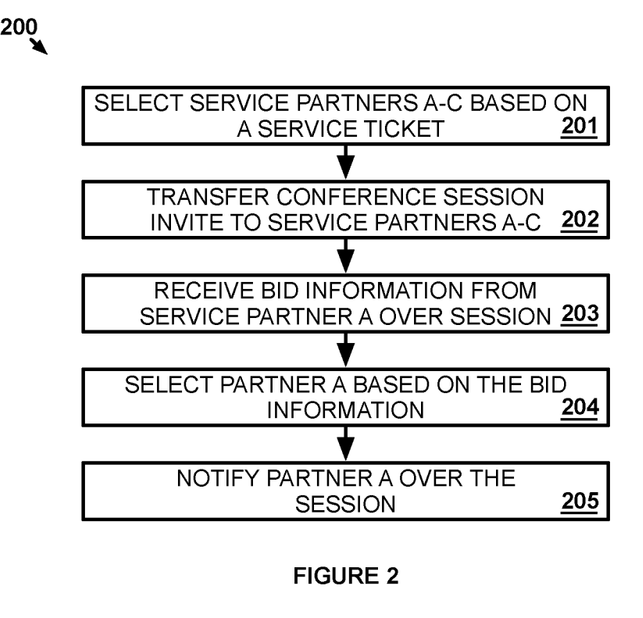
FIG. 2 illustrates an operational scenario to select a service partner using a conference system.

FIG. 2 illustrates operational scenario 200 to select a service partner using a conference system. Operational scenario 200 includes partner selection system 101 selecting service partners A-C from potential service partners based on a service ticket and partner information about the service partners that is accessible by partner selection system 101 (201). The service ticket provides details on an issue, or issues, that requires service. For instance, the service ticket may identify a customer having an issue, a problem that is occurring, a physical location, or any other information that may be relevant to selecting a service provider to handle the particular service ticket. The partner information may be stored within partner selection system 101 and/or may be accessible by partner selection system 101 from another system (e.g., over communication network 105). Partner information includes information about each potential service partner's geographic location, capabilities (e.g., expertise of technicians, type of equipment, etc.), rating from customers (e.g., based on survey responses after handling previous service tickets), performance rating (e.g., a rating for how well previous service tickets were handled from the perspective of the entity), or some other information about a service partner that could be known prior to the present service ticket. Service partners A-C are likely a subset of all the potential service partners but it is possible that service partners A-C are all of the potential service partners. While this example discusses three service partners A-C, other examples may use any number of service partners.

Partner selection system 101 may select service partners A-C from the potential service partners because service partners A-C because the partner information indicates that service partners A-C are located within a threshold distance of a location associated with the service ticket (e.g., a customer facility), or are otherwise capable of reaching the location in a reasonable amount of time, and service partners A-C each has the capability to handle the particular issue(s) described by the service ticket. Although, additional factors may contribute to the selection of service partners A-C over others of the potential service partners that are similarly located with similar capabilities. For example, partner selection system 101 may apply respective thresholds to ratings within the partner information and service partners A-C all may have satisfied those thresholds. The thresholds may also be based on a service level agreement for a customer (or other manner of indicating a customer's importance to the entity) that indicates a minimum service partner rating for service tickets from that customer.

Once service partners A-C have been selected, partner selection system 101 transfers an invite to service partners A-C to join a conference session with partner selection system 101 (202). The invite is a message, such as a calendar invite for entry in a service partner's calendar, that includes conference session information that identifies a conference session associated with the invite (e.g., a bridge identifier or uniform resource locator) as well as a time for the conference session, which may be immediate if the service ticket requires a quick response. Partner selection system 101 may exchange information with a conference system to determine the conference session information that should be included in the invite. The invite also describes the service ticket so as to give service partners A-C information about the service(s) they will have to provide in order to handle the service ticket.

In this example, each of service partners A-C receives the invite via their respective endpoints 102-104. The invite may be directed to a service partner's email address, phone number, conference system handle, or some other identifier associated with the service partner or their endpoint. In some cases, the invite may be received at multiple devices associated with a service provide but only one endpoint is shown in this example. For instance, service partner A may receive email on multiple devices, with partner A endpoint 102 being one of them. Partner A endpoint 102 is, therefore, the device in this example that partner A uses to respond to the invite. Each of service partners A-C may receive an invite to the same conference session with partner selection system 101, which may allow each of service partners A-C to view bid information from the other service partners. Alternatively, each of service partners A-C may receive respective invites to have a separate conference session with partner selection system 101, which would prevent service partners A-C from viewing each other's bid information.

After establishing the conference session with partner A endpoint 102, partner selection system 101 receives bid information in real-time over the conference session from partner A endpoint 102 (203). The conference session may also be established with partner B endpoint 103 and partner C endpoint 104 so that partners B and C can transfer their own bid information but it is possible that, despite receiving the invite, partners B and C may not join. The conference session may be a voice, video, and/or text chat based conference session that would typically be used to exchange communications in real time on behalf of users. In this case, partner selection system 101 itself is an endpoint to the conference session without a user while endpoints 102-104 each have a user representative of respective service partners A-C. Thus, rather than capturing a user's voice and/or video, partner selection system 101 itself generates communications exchanged over the conference session. In other examples, one or more of service partners A-C may configure their respective endpoints 102-104 to automatically provide bid information without needing a user.

The bid information received from partner A using partner A endpoint 102 may include a monetary cost estimate, a time to complete estimate, a listing of steps that will be required, or any other type of information that may be relevant to partner A's ability to handle the service ticket. Bid information may be provided through a text chat interface on the communication session, a user of partner A endpoint 102 may speak the bid information over the conference session for partner selection system 101 to perform speech recognition to extract the bid information, the user may display the bid information for partner selection system 101 to perform image processing on the image, a document including the bid information may be shared over the conference session with partner selection system 101, or may be provided in some other manner allowed by a conference system that is supporting the conference session. If partners B and C have also joined, then they each may provide their own bid information. In some examples, a service partner may be able to update their bid information upon hearing/seeing bid information from other service partners. For example, if the user representing service partner A hears service partner B bid a lower price, then the user may simply speak that they want their bid information updated with a lower price. Partner selection system 101 would responsively update partner A's bid information with that lower price. Similarly, in some examples, before supplying finalized bid information a service partner may ask questions and, if partner selection system 101 has an answer to the question itself, partner selection system 101 may generate and transmit a response. In those examples, partner selection system 101 may be configured to bridge a live agent into the conference session in hopes that the live agent could answer the service partner's question.

Partner selection system 101 selects service partner A based on the bid information (204). Partner selection system 101 may assign weights to different aspects of the bid information when determining that service partner A should handle the service ticket. The weighting may be based on a desired service level for the customer associated with the service ticket. For example, a customer may require fast resolution of the service ticket and partner selection system 101 may, therefore, weigh a shorter time for resolution higher than a lower cost. Partner selection system 101 may create a score based on the bid information and then select service partner A as having the higher score than that created for bid information from service partners B and C (assuming bid information was supplied by B and C).

In some examples, partner selection system 101 may consider more than just the bid information when selecting service partner A. For instance, partner selection system 101 may consider information within the partner information discussed above. Various items of partner information, such as ratings for the service partners, may be considered by partner selection system 101. Similar to how the bid information may be weighted, the items of partner information considered by partner selection system 101 may be weighted relative to each other and/or in relation to the bid information. For example, a customer rating of service provider A may be weighted such that partner selection system 101 selects service provider A because of service provider A's customer rating even though another service provider's bid information was better. In particular, partner selection system 101 may generate a score for each of service partners A-C's bid information and another score for each of service partners A-C's partner information. Those scores may be combined for each of service partners A-C and then partner selection system 101 may select service partner A because service partner A has the highest combined score. Alternative manners of considering the bid information and partner information may be used instead. For example, partner selection system 101 may employ a machine learning algorithm that was trained on bid information, partner information, results, and feedback of previous service tickets. Partner selection system 101 may then feed the bid information and partner information for the present service ticket into the machine learning algorithm, which will output the selected service partner.

After selecting service partner A, partner selection system 101 transfers a selection notification to service partner A via partner A endpoint 102 over the conference session (205). In one example, partner selection system 101 may synthesize a voice over the conference session that represents the selection notification to service partner A. A text chat message or visual (e.g., video) indicator that service partner A has been selected may also, or instead, be used. Partner selection system 101 may provide additional information over the conference session about how service provider A should proceed with handling the service ticket (e.g., may provide service provider A with information to contact the customer). Alternatively, partner selection system 101 may transfer the additional information over a separate channel, such as an interface with a ticketing system or email. Partner selection system 101 may also notify service partners B and C that they were not selected.

Advantageously, partner selection system 101 is able to leverage conference sessions that are typically used for real-time communications between human parties to retrieve bid information in real-time from service partners. This allows partner selection system 101 to quickly determine which service partner is likely the optimal service partner to handle a particular service ticket. Partner selection system 101 does not need to rely solely on existing knowledge about the service partners and no proprietary system for retrieving bid information need be created.

Figure 3:
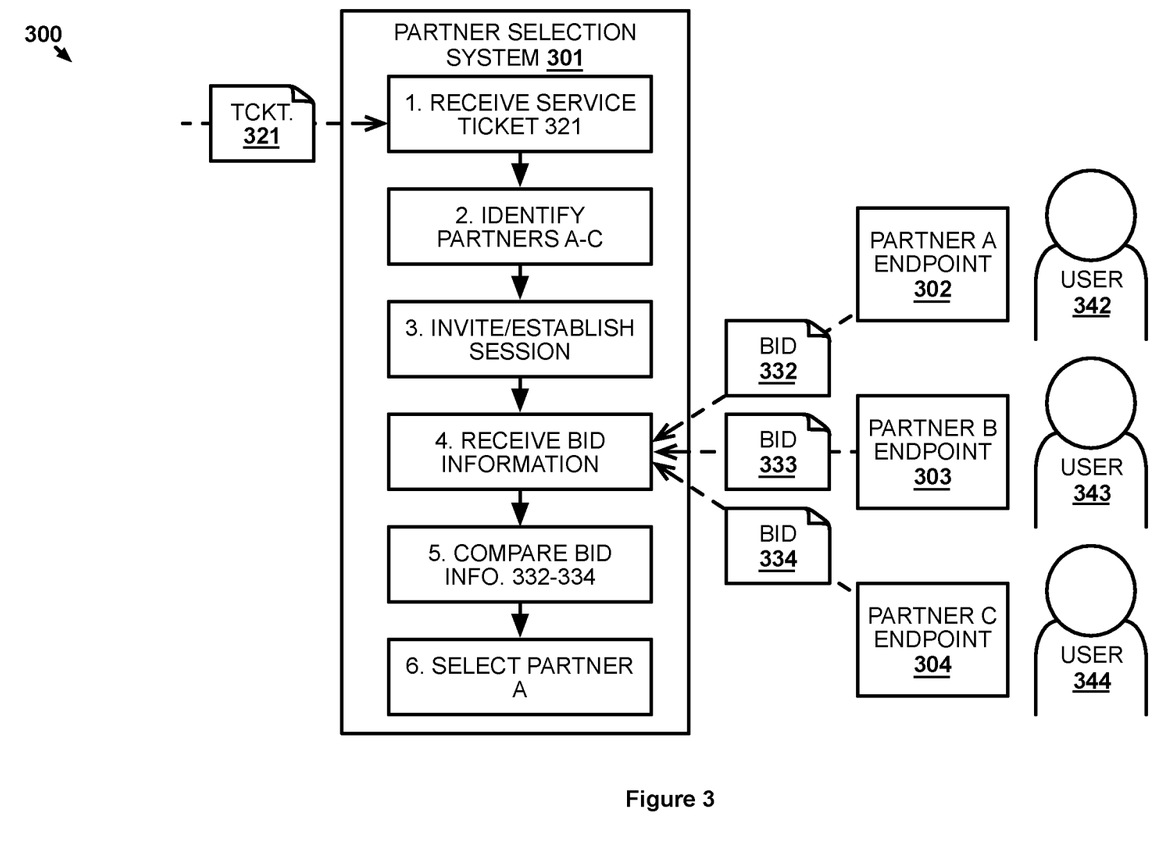
FIG. 3 illustrates another operational scenario to select a service partner using a conference system.

FIG. 3 illustrates operational scenario 300 to select a service partner using a conference system. In operational scenario 300, partner selection system 301 is an example of partner selection system 101 and endpoints 302-304 are examples of respective endpoints 102-104. User 342 is a representative of service partner A operating partner A endpoint 302, user 343 is a representative of service partner B operating partner B endpoint 303, and user 344 is a representative of service partner C operating partner C endpoint 304. As representatives of their respective service partners, users 342-344 are tasked with joining conference sessions with partner selection system 301 to supply partner selection system 301 with bid information so that partner selection system 301 can determine which of service partners A-C should be assigned to handle a corresponding service ticket on behalf of an entity associated with partner selection system 301 (e.g., a company operating partner selection system 301 to handle service ticket assignment).

In this example, partner selection system 301 receives service ticket 321 at step 1. Service ticket 321 may be received from a service ticket system that generates service tickets, may be received from a user (e.g., the user fills out an electronic form to generate the service ticket), or may be received from some other source. Service ticket 321 describes an issue requiring service that the entity associated with partner selection system 301 is obligated to handle. Rather than handling the issue itself, the entity uses partner selection system 301 to delegate handling of service ticket 321 to a third-party service partner.

After receiving service ticket 321, partner selection system 301 selects service partners A-C at step 2 as being service partners that are capable of handling service ticket 321, service partners A-C may have been selected from a pool of service partners associated with the entity (e.g., those that have applied to be considered by the entity to handle service tickets). Service partners A-C are selected at least based on their ability to handle the issue described in service ticket 321 (e.g., are listed to have the skillset/equipment that is likely needed to handle the type of issue detailed in service ticket 321). Other criteria may also be used to select service partners A-C, such as service partners A-C proximity to the physical location where service ticket 321 will be handled and a rating for each of service partners A-C.

Once service partners A-C have been selected, partner selection system 301 sends invites to service partners A-C at step 3 that invite each of service partners A-C to join a conference session to bid on handling service ticket 321. In this example, the invite may indicate that the conference session should be established in half an hour to give service partners A-C time to review service ticket 321, as described in the invite, and determine how/whether service partners A-C want to bid on handling service ticket 321. Users 342-344 operate their respective endpoints 302-304 to join the conference session with partner selection system 301. In one example, users 342-344 may each select a link in the invite to join the conference session, although other manners of joining a conference session may be used (e.g., dialing a phone number for a conference bridge system).

Over the established conference session, each of users 342-344 operate their respective endpoints 302-304 to transfer bid information. At step 4, partner selection system 301 receives bid information 332, bid information 333, and bid information 334 from service partners A-C. Users 342-344 may provide bid information 332-334 by speaking on the conference session, typing bid information 332-334 into the conference session, attaching documents including bid information 332-334 to the conference session, or using some other form of data transmission allowed by the conference session—including combinations thereof. In other examples, one or more of service partners A-C may decide not to join the conference session (e.g., may determine that service ticket 321 is not a service ticket they want to handle). In those cases, partner selection system 301 may selection additional service partner(s) from the pool of potential service partners to join the conference session in place of the non-attending service partners. Since partner selection system 301 does receive bid information from each of service partners A-C, partner selection system 301 compares bid information 332-334 at step 5 to determine which is preferable. Partner selection system 301 may compare only items of information within bid information 332-334 (weighted or otherwise) or may also include information about service partners A-C themselves (e.g., customer rating, etc.). In this example, partner selection system 301 selects service partner A at step 6 and notifies user 342 over the conference session with partner A endpoint 302.

Figure 4:
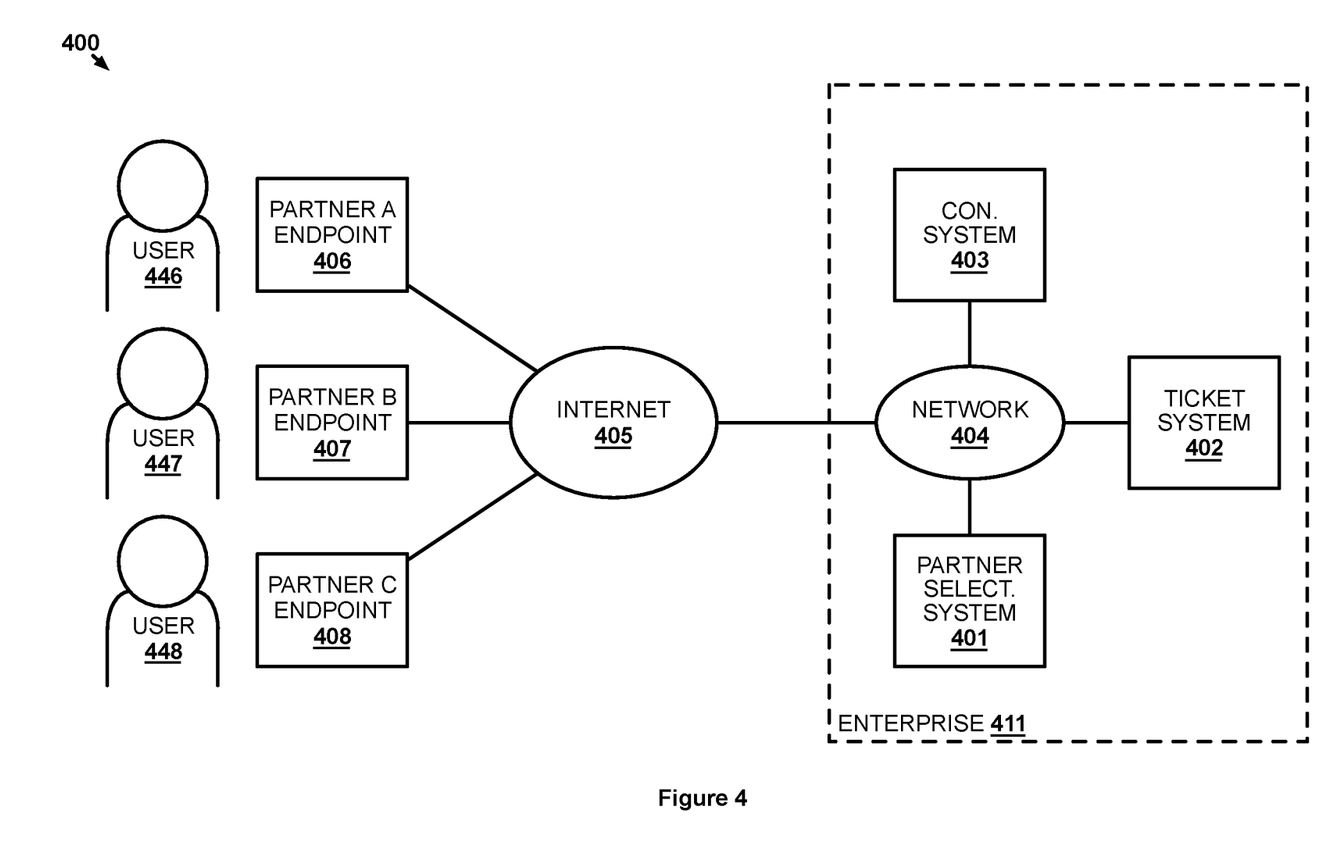
FIG. 4 illustrates another implementation for selecting a service partner using a conference system.

FIG. 4 illustrates implementation 400 for selecting a service partner using a conference system. Implementation 400 includes partner selection system 401, ticket system 402, conference system 403, enterprise network 404, internet 405, partner A endpoint 406, partner B endpoint 407, and partner C endpoint 408. Partner selection system 401, ticket system 402, and conference system 403 are all systems associated with enterprise 411. Systems 401-403 may be colocated (e.g., at a single building of enterprise 411) or may be geographically dispersed. Though shown as separate networks, a portion of enterprise network 404 may run over internet 405 (e.g., using a network tunnel between facilities of enterprise 411).

In operation, customers of enterprise 411 have service contracts with enterprise 411 to service or repair products purchased from enterprise 411. When an issue arises that requires on-site attention to address for a customer, a service ticket is created in ticket system 402. In one example, enterprise 411 may operate a contact center staffed with agents that direct ticket system 402 to create the service ticket in response to a communication from the customer. After the service ticket is created, partner selection system 401 is tasked with selecting a service partner to handle the ticket on behalf of enterprise 411, as described in more detail below.

Figure 5:
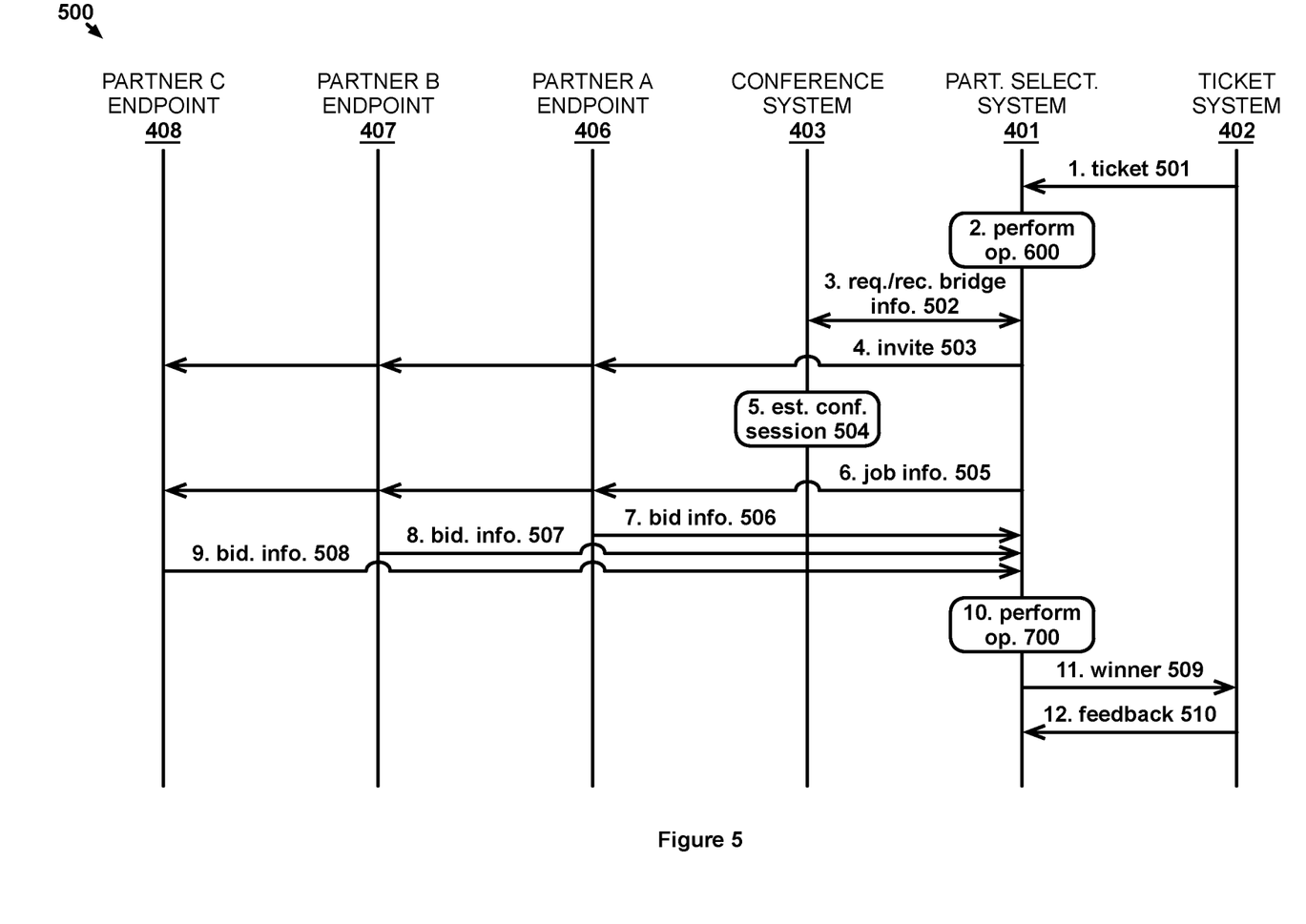
FIG. 5 illustrates an operational scenario to select a service partner using a conference system.

FIG. 5 illustrates operational scenario 500 to select a service partner using a conference system. In operational scenario 500, partner selection system 401 receives service ticket 501 at step 1 from ticket system 402. Service ticket 501 may have been created in ticket system 402 at the direction of a contact center agent of enterprise 411 that interacted with a customer. The customer may have described an issue they are having with one of enterprise 411's products and the agent then created service ticket 501 to initiate a procedure to handle the issue. Other manners of creating a service ticket may also be used. For example, a system sold by enterprise 411 may be capable of self diagnosing an issue and may automatically direct ticket system 402 to generate service ticket 501. In some examples, before transferring service ticket 501 to partner selection system 401, ticket system 402 may determine whether a service partner is required to handle service ticket 501 or whether an internal team should handle. For instance, enterprise 411 may employ a remote support team that can handle software issues remotely. If a software issue arises that is within the scope of the remote support teams capabilities, service ticket 501 would be sent to them. If, however, service ticket 501 requires hands on service, then ticket system 402 transfers service ticket 501 to partner selection system 401. While shown separately, in some examples, partner selection system 401 and ticket system 402 may be combined into a single device.

Figure 6:
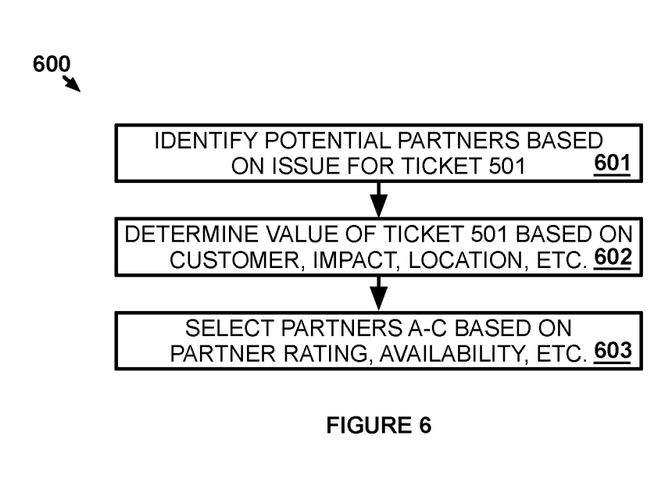
FIG. 6 illustrates another operational scenario to select a service partner using a conference system.

Upon receiving service ticket 501, partner selection system 401 performs operational scenario 600 at step 2. FIG. 6 illustrates operational scenario 600 to select a service partner using a conference system. In operational scenario 600, partner selection system 401 identifies a subset of service partners from a pool of potential service partners associated with enterprise 411 (601). The subset in this example is identified based on the issue that is the subject of service ticket 501. Partner selection system 401 identifies the subset as being service partners that are capable of handling the issue described in service ticket 501 (e.g., have the necessary skill set and equipment). If service ticket 501 will require the service partner to be onsite at the customer, then the subset may include service partners that are also be capable of being onsite at a location indicated by service ticket 501. Partner selection system 401 may identify service partner capabilities from within partner information to determine the subset or the service partners may be pre-sorted into subsets (e.g., partner selection system 401 may simply select a pre-sorted subset of service partners corresponding to an issue).

In addition to selecting service partners A-C, partner selection system 401 determines a payment value for handling partner selection system 401 (602). The payment value indicates how much enterprise 411 is willing to pay a service partner to handle service ticket 501. The payment value may be based upon the scope of work for handling the issue of service ticket 501, the particular customer associated with service ticket 501 (e.g., jobs for certain customers may be more important than those for others either based on service agreement, revenue from the customer, or some other manner of measuring a customer's importance and more important customers may warrant higher payment values), a location where handling service ticket 501 will occur (e.g., the costs in one city may be different than those in another city and the payment value may be adjusted in relation to those costs), an availability of resources to handle service ticket 501 in general or with respect to a location associated with service ticket 501 (e.g., the type of service required by service ticket 501 may be in high demand at the service location and higher payment values may be warranted to convince a service partner that service ticket 501 is worth handling over accepting another job), an impact that handling of service ticket 501 will have either on the customer and/or enterprise 411 (e.g., if the issue in service ticket 501 shut down a major component of the customer's business, the payment value for handling service ticket 501 may be higher than an issue that had a lesser effect on the business), or any other type of information that may affect how much enterprise 411 is willing to pay, or a service partner is willing to accept, to get service ticket 501 handled.

Partner selection system 401 also selects service partners A-C from the subset of service partners identified above (603). To identify service partners A-C, partner selection system 401 references partner information about the service partners in the pool. The partner information for each service partner may include a customer rating of the service partner, a rating(s) for particular technicians of the service partner, a rating from enterprise 411 for the service partner, a physical location (or locations) of the service partner, a skill set of the service partner, equipment available to the service partner, or some other type of information relevant to the service partner's ability to handle service tickets. To choose service partners A-C from the subset, in some example, service partners A-C may each meet or exceed a minimum rating (e.g., customer rating, enterprise 411 rating, and/or both) to be selected by partner selection system 401 from the pool. In some examples, partner selection system 401 may limit the number of service partners that can bid on service ticket 501 (e.g., limit to the three service partners in this case). As such, partner selection system 401 may also use partner information to narrow down the number of service partners (e.g., may select the three highest rated service partners). In some examples, partner selection system 401 may skip step 601 and instead identify service partners A-C directly from the entire pool of potential service partners rather than just the pre-filtered subset.

Referring back to operational scenario 500, partner selection system 401 requests and receives bridge information 502 at step 3 from conference system 403. Bridge information 502 includes information necessary for participants to join a particular conference session 504 facilitated by conference system 403. For example, bridge information 502 may include a URL that a participant may follow to join conference session 504 via a web or soft client, a phone number and bridge number to dial to join conference session 504 via telephone, or some other type of information that can be used to join a conference session. Bridge information 502 is included in invite 503, which is transferred to endpoints 406-408 at step 4. Invite 503 is a calendar invite that users 446-448 may accept to create a calendar entry for conference session 504 with partner selection system 401 at a time defined by invite 503. Invite 503 includes information about service ticket 501, or service ticket 501 itself, that users 446-448 can use to help make their bid for handling service ticket 501 (if they want to bid at all). For example, invite 503 may indicate the type of issue that needs to be handled, a timing requirement for when or how quickly the issue needs to be handled, a customer associated with the issue, a location where the issue will be handled, the payment value determined above, etc.

At or around the time for conference session 504 defined in invite 503, conference system 403 establishes conference session 504 at step 5 between endpoints 406-408 and partner selection system 401. The participants on conference session 504 in this case are users 446-448 and partner selection system 401 itself. It should be understood that, since each of endpoints 406-408 and partner selection system 401 may join at different times (e.g., depending upon when each of users 446-448 decide to initiate joining conference session 504), conference session 504 may not be established between all participants at the exact same time. After establishment of conference session 504, partner selection system 401 is able to provide job information 505 over conference session 504 to users 446-448 via endpoints 406-408. Job information 505 includes information about service ticket 501. Job information 505 may reiterate information included in invite 503 and/or may provide additional information, including updates to the information included in invite 503. For instance, job information 505 may include the payment value determined above as a starting point for bids from service partners A-C. Partner selection system 401 may provide job information 505 via a text channel of conference session 504, via a document sharing channel of conference session 504, by synthesizing voice communications via a voice channel of conference session 504 that can be heard by users 446-448 when reproduced by endpoints 406-408, or via some other channel of sharing information in real-time over conference session 504.

Users 446-448 are able to submit bids to partner selection system 401 by providing bid information 506-508 over conference session 504 at steps 7-9. Users 446-448 may speak bid information 506-508 into endpoints 406-408 for the voice channel of conference session 504, may enter text into endpoints 406-408 for a text channel of conference session 504, may provide documents in a document sharing channel of conference session 504, or via some other channel of sharing information in real-time over conference session 504. In some examples, users 446-448 may ask questions about service ticket 501 that partner selection system 401 itself may be able to answer itself or partner selection system 401 may coordinate a live agent to join conference session 504 and answer the questions. Additionally, partner selection system 401 may provide updated job information 505 before a final decision on selecting one of service partners A-C. For example, if bid information 506-508 is not received in a period of time from when conference session 504 is established, the payment value may go down to entice service partners to bid more quickly. The updated payment value may be sent in job information 505.

Figure 7:
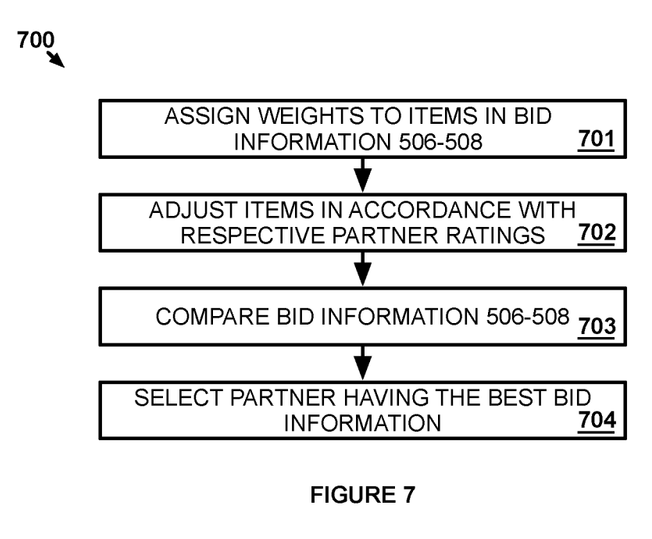
FIG. 7 illustrates another operational scenario to select a service partner using a conference system.

After receiving bid information 506-508, partner selection system 401 performs operational scenario 700 at step 10. FIG. 7 illustrates operational scenario 700 to select a service partner using a conference system. In operational scenario 700, partner selection system 401 assigns weights to items in bid information 506-508 (701). Items within bid information 506-508 may include a monetary cost for handling service ticket 501 (e.g., if less than the payment value determined above), a time when handling service ticket 501 may start, a length of time to handle service ticket 501, or some other information that may be relevant to whether partner selection system 401 should choose the associated service partner. The weights assigned to each item may be consistent across all service tickets or may be dependent on service ticket 501. For example, cost may be most important for one service ticket while time to complete may be most important for another. The monetary cost would be highest weighted for the one service ticket while time to complete would be highest weighted for the other service ticket. In some examples, each item of bid information may be translated to a score value that can more directly be compared with score values translated from corresponding items in other bid information. In those examples, after each score is weighted, an overall score for a service partner's bid information may be generated by adding the weighted item scores together.

Additionally, partner selection system 401 may reference partner information for service partners A-C to further adjust the weights given to items of bid information 506-508, or to the bid information as a whole for each service partner, based on ratings for the respective service partner (702). The ratings for a service provider may be ratings based on feedback from customers about how the service provider handled other service tickets (e.g., customer satisfaction rating), ratings from enterprise 411 about how the service provider handled other service tickets, ratings for how timely the service provider was when handling other service tickets, or any other type of rating that reflects the service provider's performance. One or more thresholds may be used by partner selection system 401 to determine whether to raise or lower the weighting of a service provider's bid information and by how much. For example, a service partner with a poor rating (i.e., below a threshold rating value) may reduce the weighting on the service partner's bid information. As such, even if the service partner's bid information would have otherwise won it the job of handling service ticket 501, the reduced weighting of that bid information may cause the job to go to another service partner with a higher rating.

After adjusting bid information 506-508, partner selection system 401 compares bid information 506-508 to each other (703). From the comparison, partner selection system 401 selects the service partner of service partners A-C that provided the best bid information (704). For example, if partner selection system 401 created a weighted score for each of bid information 506-508 in the steps above, then partner selection system 401 will simply select the service partner associated with the highest score. In other examples, partner selection system 401 may use a machine learning algorithm that is trained using the results of previous bid information comparisons. Bid information 506 is fed into the machine learning algorithm to select the best bid information based on what the algorithm learned from the training bid information.

Referred back to operational scenario 500, partner selection system 401 transfers winner message 509 at step 11 informing ticket system 402 about which of service partners A-C won the bidding process. For example, if bid information 508 was the best, then winner message 509 would indicate to ticket system 402 that service partner C should handle service ticket 501. In response to being informed of the winner, ticket system 402 may perform a process of its own that designates service partner C as being tapped to handle service ticket 501. Winner message 509 may further provide ticket system 402 with information from bid information 508 so that ticket system 402 is aware of the parameters for handling service ticket 501 that were indicated during the bid process. For example, winner message 509 may indicate the cost and job timing provided by bid information 508, which allows ticket system 402, or another system in communication with ticket system 402, to handle payment to service partner C and ensure service partner C adheres to the parameters in bid information 508.

Additionally, partner selection system 401 receives feedback 510 at step 12 to update partner information for service partner C based on service partner C's handling of service ticket 501. Feedback 510 may be received after service ticket 501 has been handled and/or before. For example, feedback 510 may include feedback from enterprise 411 indicating that service provider C requested assistance from enterprise 411 in a situation that should not have required assistance or the customer associated with service ticket 501 may provide complaints (or praises) about service provider C while handling service ticket 501. Rather than detailing a particular issue (e.g., required assistance), feedback 510 may comprise ratings of service partner C's performance. In some examples, as survey may be sent to the customer associated with service ticket 501 to receive feedback about service partner C's performance.

In some examples, feedback 510 may be used to update partner information about service partner C, which will affect the selection of service partner C to handle subsequent service tickets. For instance, a poor rating from the customer of service ticket 501 may cause service partners C's customer rating in the partner information to go down. As such, when future bid information is received from service partner C, that bid information may be adjusted lower due to service partner C's customer rating going down. Additionally, feedback 510 may effect service partner C with respect to service ticket 501. For example, if feedback 510 indicates that service partner C took too long to finish handling service ticket 501 (e.g., finished a threshold amount of time beyond that specified in bid information 508), the partner selection system 401 may automatically lower the amount that service partner C is paid for handling service ticket 501. Likewise, if service partner C exceeds expectations, then service partner C may receive a bonus payment above what was originally agreed upon. Advantageously, the receipt of feedback 510 enables partner selection system 401 not only to account for service partner C's performance when determining whether to select service partner C to handle future service tickets but also enables partner selection system 401 to hold service partner C accountable for their performance when handling service ticket 501 (e.g., to reduce pay for poor performance).

Figure 8:
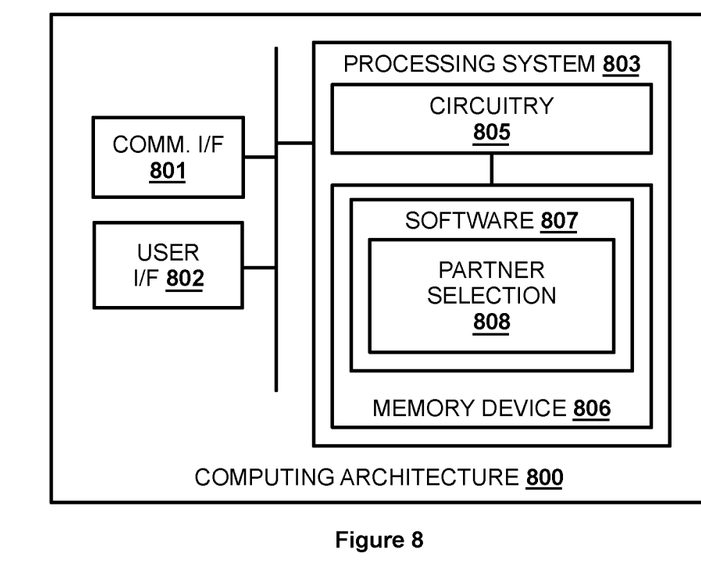
FIG. 8 illustrates a computing architecture for selecting a service partner using a conference system.

FIG. 8 illustrates computing architecture 800 for selecting a service partner using a conference system. Computing architecture 800 is an example computing architecture for partner selection system 101, partner selection system 301, and partner selection system 401, although systems 101, 301, and 401 may use alternative configurations. A similar architecture may also be used for other systems described herein (e.g., the various endpoints, conference system 403, and ticketing system 402), although alternative configurations may also be used. Computing architecture 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a computer readable storage medium, such as a disk drive, flash drive, data storage circuitry, or some other memory apparatus. In no examples would a storage medium of memory device 806 be considered a propagated signal. Operating software 807 comprises computer programs, firmware, or some other form of machine-readable processing instructions. Operating software 807 includes partner selection module 808. Operating software 807 may further include an operating system, utilities, drivers, network interfaces, applications, or some other type of software. When executed by processing circuitry 805, operating software 807 directs processing system 803 to operate computing architecture 800 as described herein.

In particular, partner selection module 808 directs processing system 803 to select service partners from a plurality of potential service partners based on a first service ticket and information about the service partners. Partner selection module 808 further directs processing system 803 to transfer an invite to the service partners to join a conference session with the partner selection system, wherein the invite describes the first service ticket, and, after the conference session is established with a first endpoint of a first service partner of the service partners, receive first bid information in real-time over the conference session from the first endpoint. Additionally, partner selection module 808 directs processing system 803 to select the first service partner based on the first bid information and a first rating for the first service partner and inform the first service partner over the conference session.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method for automatically selecting a service partner, the method comprising:
    selecting, by a partner selection system, service partners from a plurality of potential service partners based on a first service ticket and partner information about the service partners;
    transferring, by the partner selection system, a calendar invite to the service partners to join a conference session with the partner selection system, wherein the calendar invite describes the first service ticket, wherein the conference session includes a channel for exchanging real-time communications of users operating endpoints connected to the conference session;
    after establishing the conference session with a first endpoint of a first service partner of the service partners, receiving, by the partner selection system, first bid information in real-time over the channel from the first endpoint;
    selecting, by the partner selection system, the first service partner based on the first bid information; and
    transferring, by the partner selection system, a selection notification to the first service partner over the conference session.

2. The method of claim 1, further comprising:
    receiving, by the partner selection system, the first service ticket from a service ticketing system.

3. The method of claim 1, further comprising:
    determining, by the partner selection system, a payment value of the first service ticket, wherein the calendar invite includes the payment value.

4. The method of claim 3, wherein determining the payment value is based on one or more of a group comprising a first requestor associated with the first service ticket, an impact of the first service ticket, and a location of the first service ticket.

5. The method of claim 3, further comprising:
    reducing, by the partner selection system, the payment value as time passes until the first service ticket is completed.

6. The method of claim 3, further comprising:
    reducing, by the partner selection system, the payment value in response to feedback from a first requestor associated with the first service ticket.

7. The method of claim 1, further comprising:
    receiving, by the partner selection system, second bid information from a second service partner of the service partners; and
    wherein selecting the first service partner includes determining that a combination of the first bid information and a first rating for the first service partner is better than a combination of the second bid information and a second rating for the second service partner.

8. The method of claim 7, further comprising:
    determining, by the partner selection system, the first rating based on feedback regarding previous service tickets that the first service partner has handled.

9. The method of claim 8, further comprising:
    receiving, by the partner selection system, at least a portion of the feedback from requestors associated with the previous service tickets.

10. The method of claim 7, wherein the first rating is included in the partner information.

11. An apparatus for a partner selection system to automatically select a service partner, the apparatus comprising:
one or more computer readable storage media;
a processing system operatively coupled with the one or more computer readable storage media; and
program instructions stored on the one or more computer readable storage media that, when read and executed by the processing system, direct the processing system to:
select service partners from a plurality of potential service partners based on a first service ticket and information about the service partners;
transfer a calendar invite to the service partners to join a conference session with the partner selection system, wherein the calendar invite describes the first service ticket, wherein the conference session includes a channel for exchanging real-time communications of users operating endpoints connected to the conference session;
after the conference session is established with a first endpoint of a first service partner of the service partners, receive first bid information in real-time over the channel from the first endpoint;
select the first service partner based on the first bid information and a first rating for the first service partner; and
inform the first service partner over the conference session.

12. The apparatus of claim 11, wherein the program instructions further direct the processing system to:
receive the first service ticket from a service ticketing system.

13. The apparatus of claim 11, wherein the program instructions further direct the processing system to:
determine a payment value of the first service ticket, wherein the calendar invite includes the payment value.

14. The apparatus of claim 13, wherein determination of the payment value is based on one or more of a group comprising a first requestor associated with the first service ticket, an impact of the first service ticket, and a location of the first service ticket.

15. The apparatus of claim 13, wherein the program instructions further direct the processing system to:
reduce the payment value as time passes until the first service ticket is completed.

16. The apparatus of claim 13, wherein the program instructions further direct the processing system to:
reduce the payment value in response to feedback from a first requestor associated with the first service ticket.

17. The apparatus of claim 11, wherein the program instructions further direct the processing system to:
receive second bid information from a second service partner of the service partners; and
wherein to select the first service partner, the program instructions direct the processing system to determine that a combination of the first bid information and a first rating for the first service partner is better than a combination of the second bid information and a second rating for the second service partner.

18. The apparatus of claim 17, wherein the program instructions further direct the processing system to:
determine the first rating based on feedback regarding previous service tickets that the first service partner has handled.

19. The apparatus of claim 18, wherein the program instructions further direct the processing system to:
receive at least a portion of the feedback from requestors associated with the previous service tickets.

20. One or more computer readable storage media having program instructions stored thereon to automatically select a service partner, the program instructions, when read and executed by a processing system of a partner selection system, direct the processing system to:
select service partners from a plurality of potential service partners based on a first service ticket and information about the service partners;
transfer a calendar invite to the service partners to join a conference session with the partner selection system, wherein the calendar invite describes the first service ticket, wherein the conference session includes a channel for exchanging real-time communications of users operating endpoints connected to the conference session;
after the conference session is established with a first endpoint of a first service partner of the service partners, receive first bid information in real-time over the channel from the first endpoint;
select the first service partner based on the first bid information and a first rating for the first service partner; and
inform the first service partner over the conference session.

* * * * *